United States Patent [19]

Morita et al.

[11] Patent Number: 4,614,255

[45] Date of Patent: Sep. 30, 1986

[54] HYDRAULIC SHOCK ABSORBER FOR VEHICLES

[75] Inventors: Isamu Morita; Yasuji Nozawa; Hideki Maru, all of Saitama, Japan

[73] Assignee: Honda Giken Kogyo Kabushiki Kaisha, Tokyo, Japan

[21] Appl. No.: 507,159

[22] Filed: Jun. 23, 1983

Related U.S. Application Data

[63] Continuation-in-part of Ser. No. 213,845, Dec. 8, 1980, abandoned.

[30] Foreign Application Priority Data

Dec. 7, 1979 [JP] Japan .................... 54-158762

[51] Int. Cl.$^4$ .......................... F16F 9/08
[52] U.S. Cl. .................... 188/315; 188/298; 188/314; 267/64.23
[58] Field of Search ........ 188/298, 282, 317, 314, 188/315, 322.13, 322.14, 322.15; 267/64.23, 64.27, 122, 123

[56] References Cited

U.S. PATENT DOCUMENTS

| | | | |
|---|---|---|---|
| 2,695,079 | 11/1954 | Brundrett | 188/315 |
| 2,948,357 | 8/1960 | Cookson | 188/322.14 |
| 3,105,574 | 10/1963 | Hoffmann et al. | 188/298 X |
| 3,469,661 | 9/1969 | Hoffmann et al. | 188/317 X |
| 3,625,321 | 12/1971 | Lutz | 188/314 X |
| 4,010,829 | 3/1977 | Naito et al. | 188/322.14 X |
| 4,054,277 | 10/1977 | Sirven | 188/315 X |
| 4,132,395 | 1/1979 | Fox, Jr. | 188/314 X |

FOREIGN PATENT DOCUMENTS

| | | | |
|---|---|---|---|
| 565074 | 10/1958 | Canada | 188/315 |
| 1157857 | 11/1963 | Fed. Rep. of Germany | 267/64.23 |
| 1195615 | 6/1965 | Fed. Rep. of Germany | 188/314 |
| 1229789 | 12/1966 | Fed. Rep. of Germany | 188/314 |
| 1480229 | 6/1970 | Fed. Rep. of Germany | 188/298 |
| 54-120375 | 9/1979 | Japan | 188/314 |

*Primary Examiner*—George E. A. Halvosa
*Attorney, Agent, or Firm*—Irving M. Weiner; Joseph P. Carrier; Pamela S. Burt

[57] ABSTRACT

A hydraulic shock absorber for vehicles including inner and outer cylinders, and a casing defining an oil chamber therein. The oil chamber is arranged to be in communication with the interior of the inner cylinder. A gas chamber hermetically defined by an elastic metal membrane and having a predetermined volume of gases confined therein is disposed in the oil chamber. The arrangement provides desirable damping characteristics in a substantially low damping force range as well as in an inherent or preset damping force range.

13 Claims, 11 Drawing Figures

HYDRAULIC SHOCK ABSORBER FOR VEHICLES

This is a continuation-in-part of application Ser. No. 213,845, filed Dec. 8, 1980, now abandoned.

BACKGROUND OF THE INVENTION

1. Field of the Invention

The present invention relates to a hydraulic shock absorber for use in vehicles, and more particularly to an improved hydraulic shock absorber which effectively suppresses vibrations caused by large shocks to the vehicle, as well as slight vibrations caused by small irregularities of road surfaces.

2. Description of Relevant Art

In hydraulic shock absorbers for vehicles, it is desirable to raise the hydraulic damping force thereof to some extent in order to adequately control the large vibration of vehicle parts which are not spring-supported caused by relatively large irregularities of a road, the resonance of spring-supported parts, rolling during steering operation, and pitching during acceleration or braking. On the other hand, if the damping force is present to too high a level, the shocks to the parts which are not spring-supported caused by relatively small irregularities of the road surface are transmitted to the vehicle body thereby detrimentally affect riding comfort and increase the level of noises from the road.

SUMMARY OF THE INVENTION

The present invention provides a hydraulic shock absorber for vehicles including inner and outer cylinders filled with a working oil, a piston slidably fitted in the inner cylinder and supported by a piston rod, and a bottom valve disposed at the bottom of the inner and outer cylinders. A first passage extends axially through the piston, and cooperates with a first valve member. A second passage is provided in the bottom valve for providing communication between the inner and outer cylinders, and cooperates with a second valve member. A casing defining an oil chamber therein is provided such that the oil chamber can be in communication with the interior of the inner cylinder. A gas chamber hermetically defined by an elastic metal membrane and confining gases therein is disposed in the oil chamber. The elastic metal membrane is elastically deformable while compressing the gases in the gas chamber at a rate corresponding to a raising oil pressure in the oil chamber during only an initial state of at least a compression stroke of the piston. The pressure of the gases confined in the gas chamber is substantially the same as the working oil pressure when the piston stands still. The volume $V$ (cm$^3$) of the gases in the gas chamber is such that: $V \leq 0.75\pi d^2$ or $0.75\pi(D^2-d^2)$, wherein $d$ = the diameter of the piston rod (in centimeters) and $D$ = the inside diameter of the inner cylinder (in centimeters).

It is an object of the invention to provide a hydraulic shock absorber which controls not only large vibrations caused by relatively large irregularities of a road and the rolling and pitching of spring-supported parts, but also controls small vibrations caused by relatively small irregularities of the road surface, such that satisfactory damping characteristics can be attained in a substantially low damping force range as well as an inherent or preset damping force range.

Another object of the present invention is to provide a hydraulic shock absorber having a simplified construction which can be produced at a reduced cost, and which is conducive for mass-production.

Other objects and advantages of the present invention will become apparent from the following detailed description of preferred embodiments of the invention, when read in conjunction with the accompanying drawings.

DETAILED DESCRIPTION OF PREFERRED EMBODIMENTS

Figure 1:
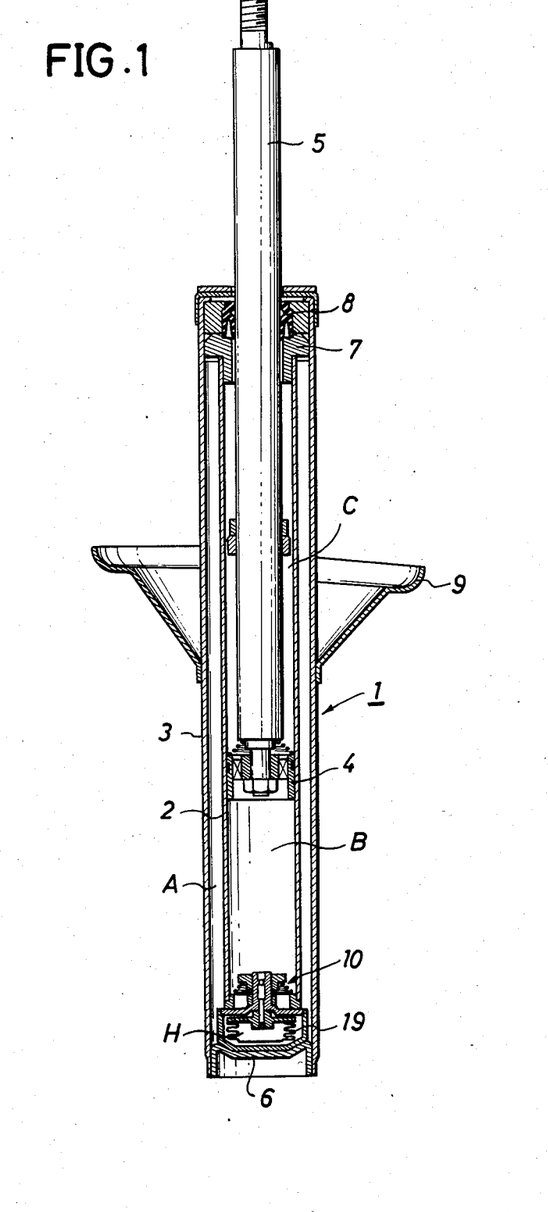
FIG. 1 is a schematic longitudinally sectioned view of a shock absorber construction in accordance with a first embodiment of the present invention.

With reference to FIG. 1, there is shown a shock absorber 1 having a dual-cylinder construction including inner and outer cylinders 2 and 3. A piston 4 is slidably fitted in the inner cylinder 2, the rod 5 of piston 4 being extended upwardly through and out of the inner cylinder 2 and connected to the body of a vehicle. The outer cylinder 3, on the other hand, has the lower portion thereof connected to a wheel of the vehicle. As described in greater detail hereinbelow, the piston 4 is provided with a valve and an orifice, and the inner and outer cylinders 2 and 3 have the bottoms thereof sealed with a plug 6, on which a bottom valve 10 is mounted. Further, the inner and outer cylinders 2 and 3 have the upper portions thereof concentrically jointed by means of a rod guide 7. Also shown in FIG. 1 is an oil seal 8 and a spring seat 9.

A reservoir chamber A is formed between the inner and outer cylinders 2 and 3, and oil chambers B and C are formed in the inner cylinder 2 such that they are separated by means of the piston 4. Each of the chambers A, B and C are filled with a working oil in which substantially no pressure is generated when the piston 4 is standing still.

Figure 2:
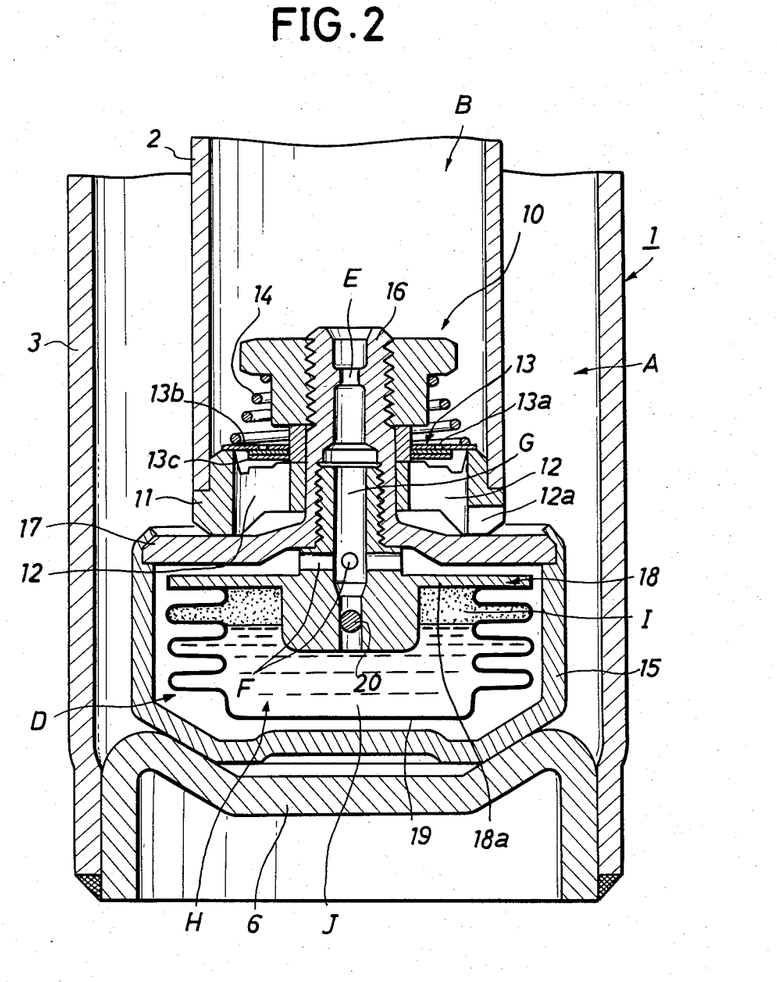
FIG. 2 is an enlarged sectional view showing an essential portion of the shock absorber of FIG. 1.

As shown in FIG. 2, the bottom valve 10 has the body 11 thereof fitted to the bottom of the inner cylinder 2. The valve body 11 is formed therethrough with axial passages 12 for providing communication between the lower piston chamber B and the reservoir chamber A. The axial passages 12 are preferably arranged radially and have the communication portions 12a thereof radially opened to communicate with the reservoir chamber A. A check valve 13 is disposed above passages 12, and is biased by a spring 14 to close the passages 12. The check valve 13 includes an upper plate member 13b, which in turn is formed with orifices 13a, and a plurality of lower elastic members 13c such as leaf springs which are disposed below the upper plate member 13b for closing the lower side of the orifices 13a. The elastic members 13c of check valve 13 are warped in a preset compression stroke of the piston 4 to thereby open the orifices 13a so that communication may be established between the two chambers B and A to thereby produce damping forces. In an expansion stroke of the piston 4, the valve 13 is pulled up against the resiliency of the spring 14 to thereby introduce the working oil from the chamber A into the chamber B by way of the passage 12. The construction and operations thus far described are substantially well known.

Below the body 11 and above the plug 6 is provided a chamber D which is defined by a casing 15. The chamber D communicates with the chamber B in the inner cylinder 2 by way of a tubular core 16 concentrically and securely fitted through the valve body 11 and provided with an orifice E. The core 16 has a flanged portion 17 thereof radially extended under the body 11 so as to seal the lower end of the valve body 11 and serve as an upper portion of the casing 15. In the core 16 on the lower side thereof is securely fitted a holder 18 which projects into the chamber D and has a communication passage G formed therethrough which is stopped near the lower end thereof with a suitable stop member 20. The passage G has radial branch passages F formed above the stop member 20 and opened in the chamber D, thus establishing the aforesaid communication between the chambers B and D. The holder 18 is further formed with a radially extending flanged portion 18a having an enclosed elastic metal membrane 19, such as a metal bellows made of phosphor bronze, secured to the lower side thereof. The elastic metal membrane 19, together with the holder 18, define a gas chamber H hermetically separated from the chamber D. The gas chamber H is filled with gases I such as $N_2$ and a liquid such as oil J in the embodiment shown. The pressure of the gases I in the chamber H is substantially the same as that of the working oil in the chamber B while the vehicle is standing still i.e., substantially atmospheric pressure.

The actions and effects of the shock absorber 1 will now be described in detail hereinbelow.

In the compression stroke, as the piston 4 slides down, the chamber B has a decreasing volume corresponding to the advance of the piston rod 5, and the working oil therein has a rising pressure due to reaction of the gases I. At a preset piston position or at a preset oil pressure, the check valve 13 opens, thus admitting oil into the chamber A and permitting the shock absorber 1 to function in a known manner. More specifically, in the initial state of the compression stroke before the opening of the check valve 13, the oil in the chamber B flowing through the orifice E and the passages G and F to the chamber D exerts its pressure on the elastic metal membrane 19. Because the gas chamber H hermetically defined by the elastic metal membrane 19 has its pressure preset at substantially the same level as that of the working oil pressure in the chamber B when the piston 4 stands still (i.e., substantially atmospheric pressure), it deforms inwardly to compress the gases I according to the rising oil pressure in the initial stage of compression of the piston 4. Thus, the oil is permitted to continuously enter into chamber D by the same volume as the compression of the gases I corresponding to the advance of the piston rod 5. Therefore, the oil in chamber D is subjected to an increasing reaction force of the gases I and the membrane 19 and has a pressure balanced therewith, thus producing desirable small damping forces in the initial stroke. It will thus be understood that a favorable hydraulic shock absorbing effect in the initial stage of the piston stroke or within a small stroke range is obtained, so that even the vibrations of the vehicle caused by small irregularities in the road surface can be absorbed and damped, so as to be restrained from being transmitted to the vehicle body.

As the piston stroke advances, the combined force of the pressure in the gas chamber H and the elastic force of the elastic metal membrane 19 reaches the preset pressure of the check valve 13, whereupon valve 13 is opened to allow the working oil to flow through the passages 12 into the reservoir chamber A, thus producing desired damping forces. In this manner, the preset intrinsic damping force is smoothly reached.

If the elastic metal membrane 19 should happen to abut against surrounding structure, the working oil J filled in the gas chamber H functions to dampen the shocks, if any.

From the foregoing, it will be understood that favorable low damping forces in the initial stroke stage or within the small stroke range caused by the small irregularities of road surfaces, as well as the intrinsic damping characteristics, can thus be obtained in accordance with the present invention. The vibrations caused by small irregularities of road surfaces are thus restrained from being transmitted to the vehicle body, so that the disadvantages attendant conventional shock absorber constructions can be eliminated. In addition, the shock absorber according to the present invention has an advantageous simplified construction in that the gas chamber is sealed with the elastic metal membrane and is subjected to the oil pressure through the orifice. Because the elastic membrane is formed of metal bellows, it provides no permeability for the gases so as to ensure functioning thereof for a long period of time. Further, because the moving parts have a light weight and are made of an elastic material, the responsiveness thereof is excellent, so as to ensure the desired effects within the low damping force range.

Figure 3:
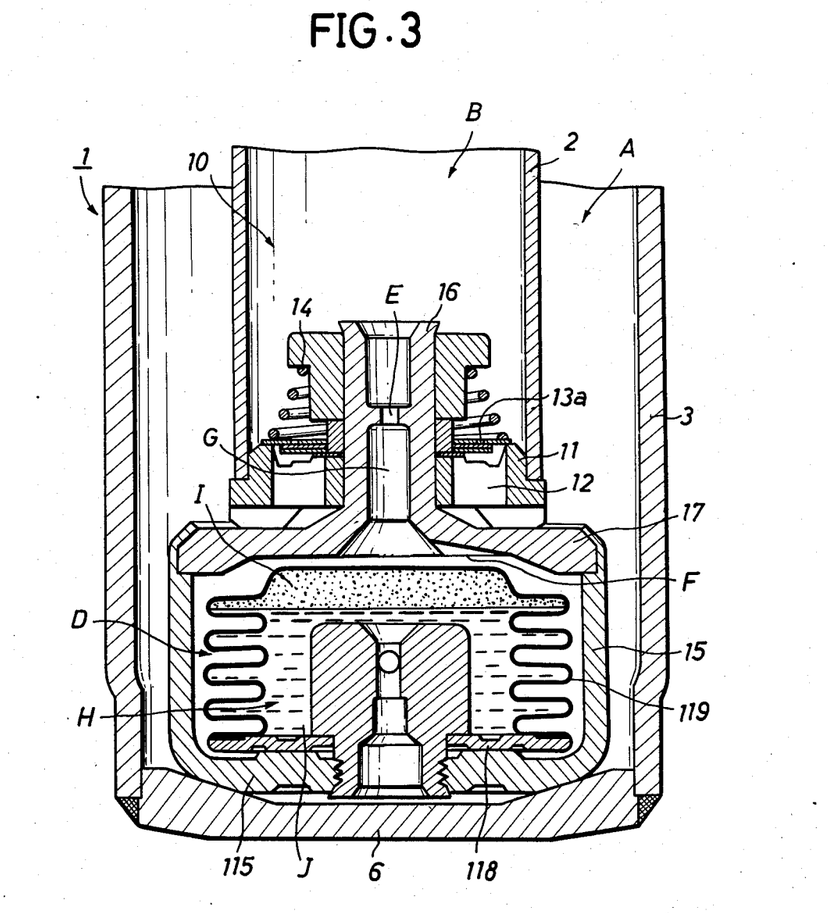
FIG. 3 is a view similar to FIG. 2, but showing a modification of the shock absorber of FIGS. 1 and 2.

FIG. 3 shows a modification of the first embodiment of FIGS. 1 and 2, such modification having substantially the same fundamental construction as that of the above-described first embodiment. In FIG. 3, on the bottom 115 of the casing 15 is disposed a disc-shaped holder 118, above which is disposed an elastic metal membrane 119 so as to define the gas chamber H. All other parts, having the same construction and operation as described hereinabove with reference to FIGS. 1 and 2, are designated by the same reference numerals and letters in FIG. 3.

Figure 4:
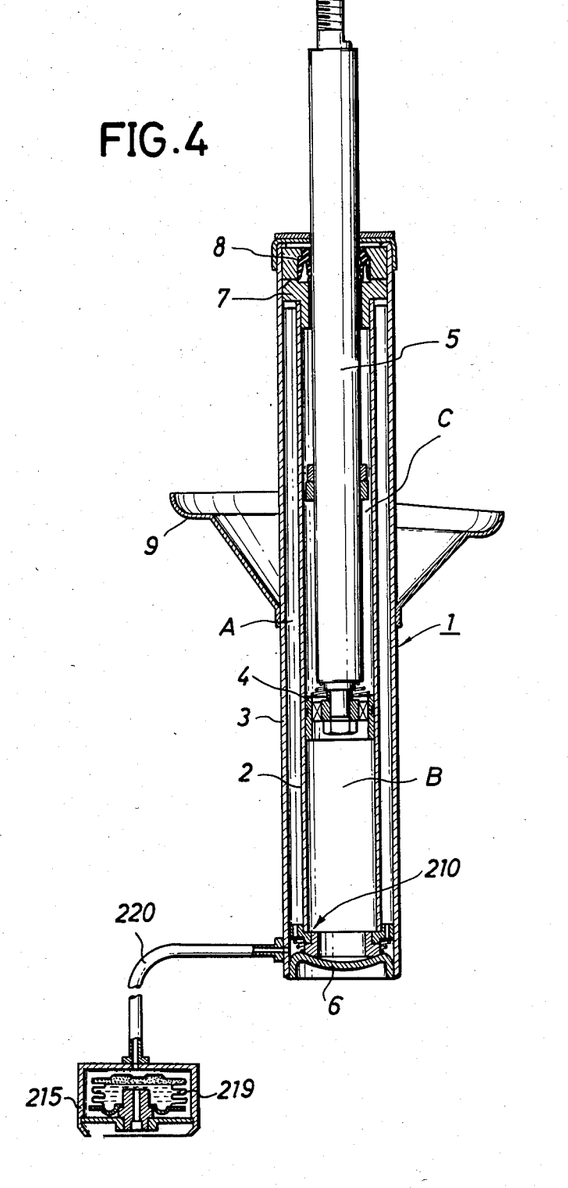
FIG. 4 is a view similar to FIG. 1, but showing a second embodiment of the invention wherein a gas chamber is provided at the side of a bottom valve and the outside of a shock absorber.
Figure 5:
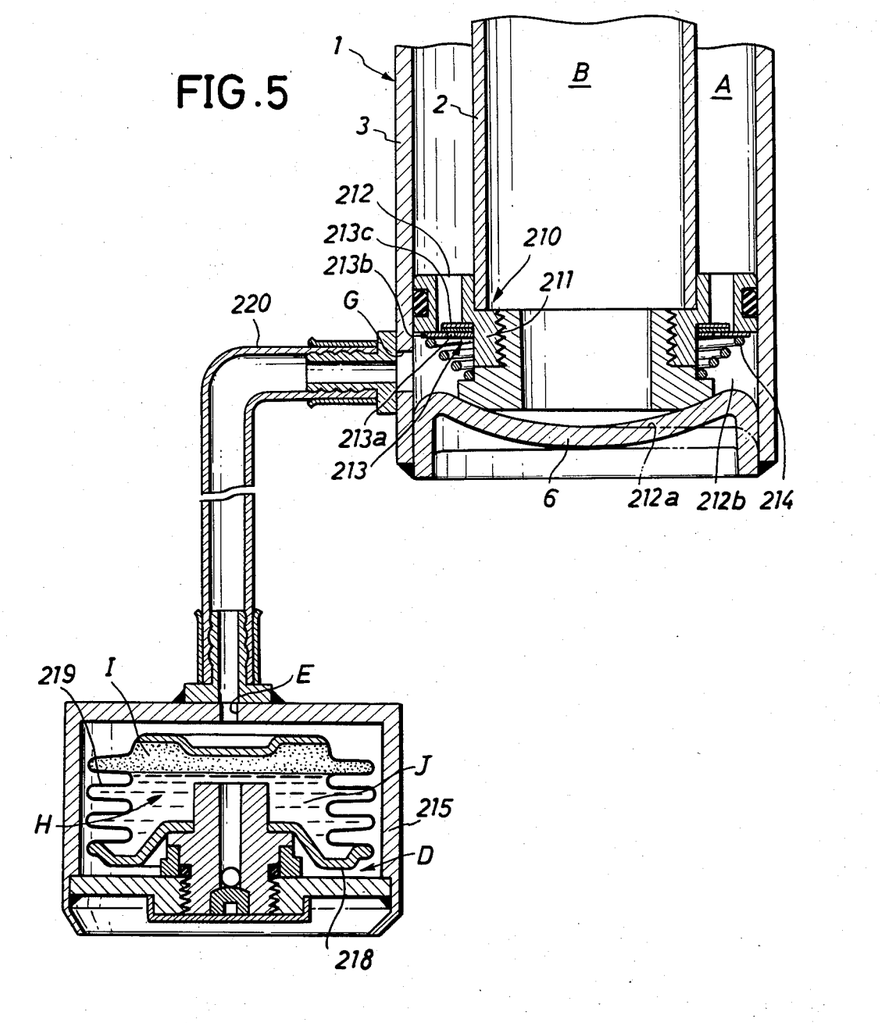
FIG. 5 is an enlarged sectional view showing an essential portion of the shock absorber of FIG. 4.

FIGS. 4 and 5 show another embodiment of the invention wherein a gas chamber is disposed at the side of a bottom valve and outside of the cylinders. The shock absorber itself is similar to that described hereinabove, and accordingly like parts are designated by like reference numerals and letters.

With reference to FIG. 5 showing an enlarged sectional view of the bottom valve, a bottom valve 210 has the body 211 thereof formed with passages 212 for providing communication between the lower portions of the inner and outer cylinders, i.e., the chambers B and A. A check valve 213 is elastically seated upon a spring 214 and is formed with orifices 213a, which are closed by a plate member 213c. Provided around bottom valve 210 is a passage 212b leading to the chamber B through a communication passage 212a formed under bottom valve 210. Thus, the chambers B and A communicate through the oil passages 212 in accordance with the action of the check valve 213. In the bottom valve 210, the orifices 213a are opened at the preset stroke in the compression stroke to thereby establish the preset damping force, and the check valve 213 is opened against the action of the spring 214 at the expansion stroke so that the oil is introduced from the chamber A into the chamber B through the oil passages 212. Thus, the bottom valve 210 operates in a manner similar to that described hereinabove.

The outer cylinder 3 is formed at its lower portion with an opening G which leads to the passage 212b and to which a communication conduit 220 is connected. At the leading end of the communication conduit 220 is provided an oil chamber D, which is defined by a seal casing 215 communicating with the passage 212b through both an orifice E formed in the casing 215 and the communication conduit 220. Within the casing 215 is disposed an inverted elastic metal membrane 219, such as a metal bellows made of phosphor bronze, to thereby define a gas chamber H hermetically separated from the surroundings. Gas chamber H has the lower wall thereof defined by a holder 218. The gas chamber H is filled, in a manner similar to the first embodiment, with gases I such as $N_2$ and with a liquid J such as oil, as described hereinabove. The pressure in the gas chamber H is preset to be substantially the same as the pressure of the working oil in the chamber B when the shock absorber is not in operation.

It will thus be understood that the gas chamber according to the present invention can be disposed outside of the cylinders by establishing communication therebetween by means of the conduit 220, which causes the pressure in the chamber B to be exerted upon the membrane 219 defining the gas chamber H such that operations similar to those of the first embodiment can be effected. According to the second embodiment, axial elongation of the bottom portion of the shock absorber can be avoided, while the construction of the lower portion of the bottom valve is prevented from becoming complex.

Figure 6:
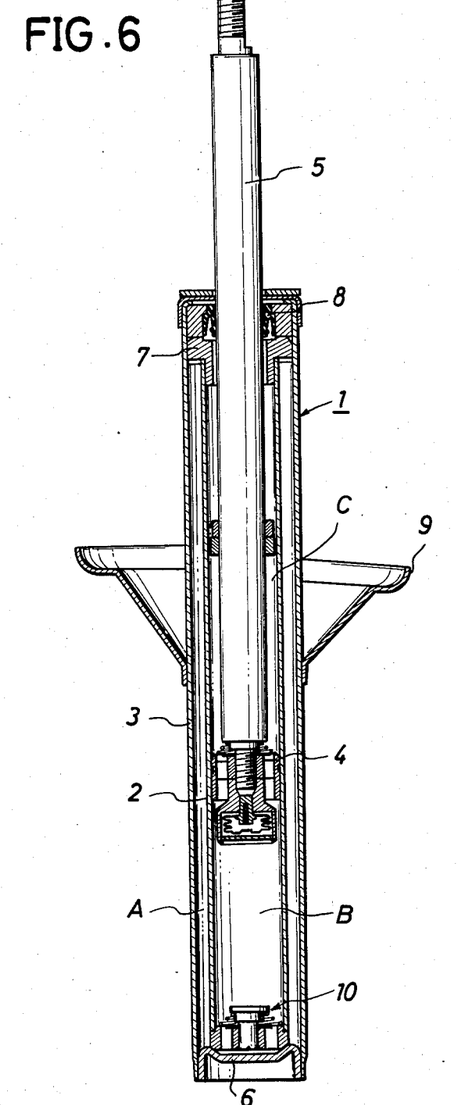
FIG. 6 is a schematic longitudinally sectioned view showing a third embodiment of the shock absorber according to the present invention.
Figure 7:
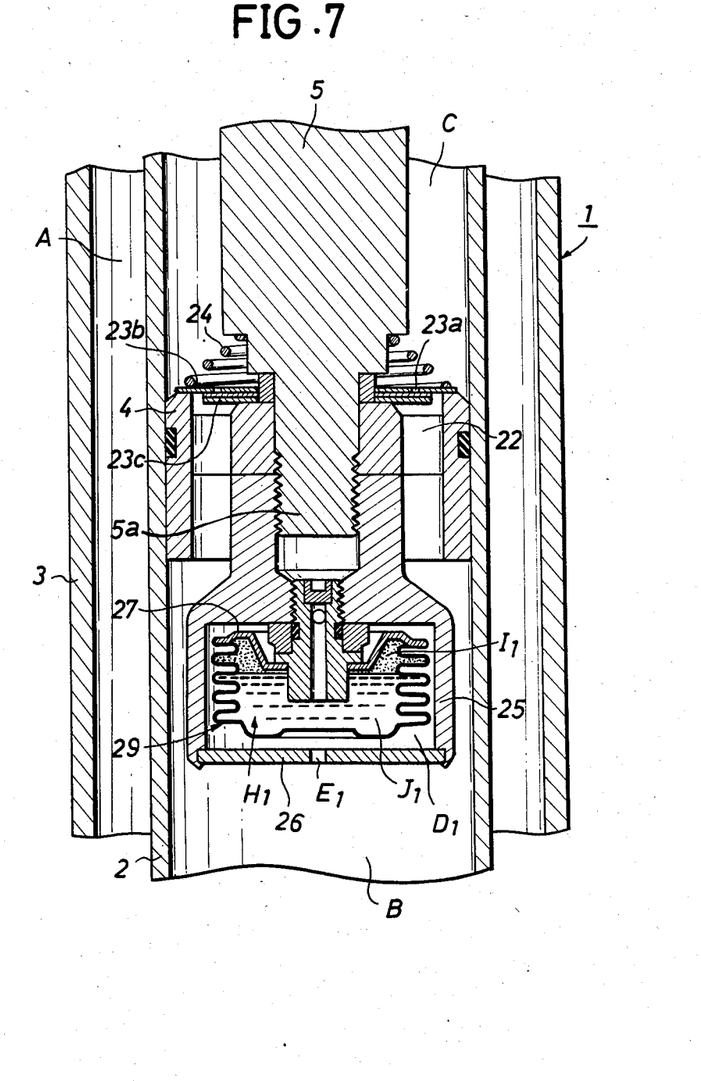
FIG. 7 is an enlarged sectional view showing an essential portion of the shock absorber of FIG. 6.
Figure 8:
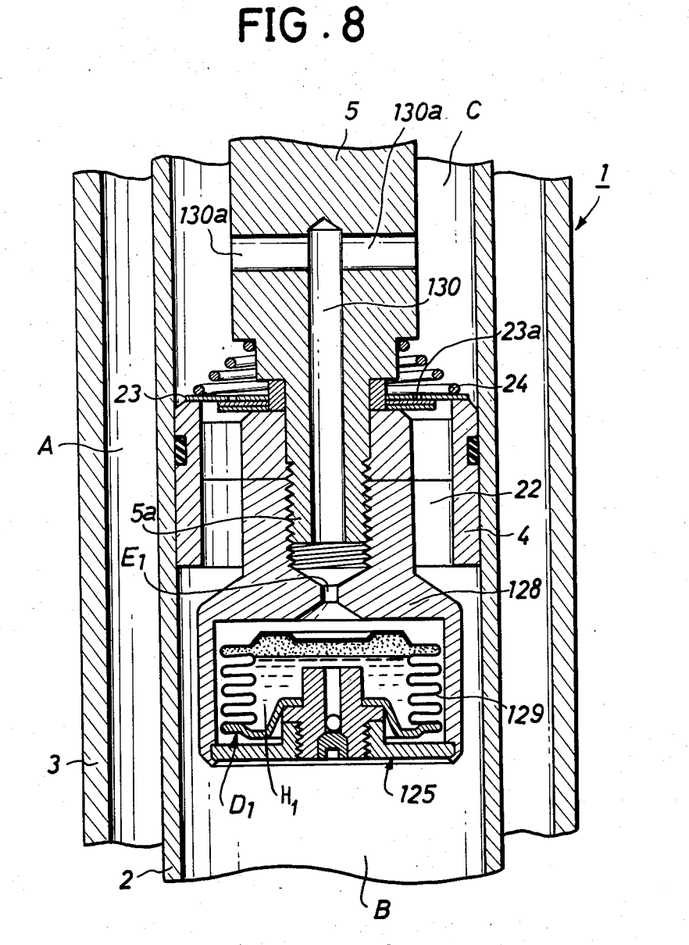
FIG. 8 is a view similar to FIG. 7, but showing a modification of the shock absorber of FIGS. 6 and 7.

FIGS. 6 through 8 show a third embodiment of the invention wherein a gas chamber is disposed at the side of a piston. Because the construction of the hydraulic shock absorber itself is similar to that of the above-described first and second embodiments, like parts are designated by like reference numerals and letters.

With reference to FIG. 7 which shows an enlarged view of the piston and the area therearound, the piston 4 is formed with a plurality of axial oil passages 22. A check valve 23 has a body plate 23c which is formed with an orifice 23a. The body plate 23c is biased downwardly by the force of a spring 24 and is disposed to face the upper opening of oil passages 22. The orifice 23a of the check valve 23 is closed by a lower elastic plate 23c such that it can be opened, at the expansion stroke, by the warp of the plate 23c, to establish communication between the chambers B and C through the oil passages 22. At the compression stroke, on the other hand, the piston 4 slides in the chamber B toward the bottom valve 10 to open the check valve 23.

From the leading end 5a of the piston rod 5, there depends downwardly of the piston 4 a casing 25 which defines a chamber $D_1$. Chamber $D_1$ communicates with chamber B through the orifice $E_1$ which is formed in the bottom 26 of the casing 25. Within the chamber $D_1$, an elastic metal membrane 29, such as a metal bellows made of phosphor bronze, is disposed to depend from a holder 27 which is supported by the upper wall of the casing 25 so as to form therein a gas chamber $H_1$ which is hermetically separated from the surroundings. The gas chamber $H_1$ is filled with both gases $I_1$ such as $N_2$ and a liquid $J_1$ such as an oil, and the pressure of the gases $I_1$ is preset at substantially the same level as that of the working oil in the chamber B when the shock absorber is not in operation.

The operations and effects of the third embodiment of the invention will now be described in detail hereinbelow.

At the compression stroke, as the piston 4 slides down, the oil pressure in the oil chamber B rises to open the check valve 23 so that the oil passes through the passages 22 from the chamber B to the chamber C, while the oil, by a quantity substantially corresponding to the advance of the piston rod 5, is discharged out into the chamber A through an orifice of the bottom valve 10, thus developing the inherent damping force in a known manner. Prior to opening of the check valve 23, the oil pressure produced in the chamber B by the initial movement of piston 4 is first introduced through the orifice $E_1$ into the chamber $D_1$ so that it is exerted upon the elastic metal membrane 29 defining the gas chamber $H_1$, from the lower end of the chamber $H_1$. Because the pressure of gases in the gas chamber $H_1$ is preset at substantially the same level as that of the oil pressure in the chamber B when the shock absorber is not in operation, the gas chamber $H_1$ is deformed and compressed inwardly by the low oil pressure rise at the initial stage of the operation of piston 4 so that the oil, by a quantity corresponding to the compression of the gas chamber $H_1$, enters into the chamber $D_1$, whereby the low damping force at the initial stage of the piston stroke is generated to develop the desired damping force at the initial stroke. Thus, the hydraulic shock absorbing operations at the initial stage of the piston stroke or within a small stroke range are effected so that the vibrations of the vehicle caused by the small irregularities of road surfaces can be absorbed and damped, thus being restrained from being transmitted to the vehicle body.

As the piston advances, the combined force of the pressure in the gas chamber $H_1$ and the elastic force of the elastic metal membrane reaches the predetermined pressure of the check valve 23, whereupon valve 23 is opened to allow the working oil to flow through the passage 22 into the chamber C so that the inherent damping force is established.

FIG. 8 shows a modification of the embodiment shown in FIGS. 6 and 7, by which the low damping force can be obtained in the initial stage of the expansion stroke. A casing 125 defining chamber $D_1$ has disposed therein the gas chamber $H_1$ which is defined by an inverted elastic metal membrane 129 which is downwardly deformable. The casing 125 also has a ceiling wall 128 formed with the orifice $E_1$. The piston rod 5 has its leading end 5a formed therein with a passage 130 which has its lower open end facing the orifice $E_1$, and is provided at its upper end above piston 4 with passages 130a, thus establishing communication between the chambers C and $D_1$. As a result, before the orifice 23a of the check valve 23 is opened during the expansion operation, the oil pressure in the chamber C is introduced through the passages 130a and 130 through the orifice $E_1$ into the chamber $D_1$ to deform and compress the gas chamber $H_1$ downwardly, thus establishing the aforesaid damping force.

Figure 9:
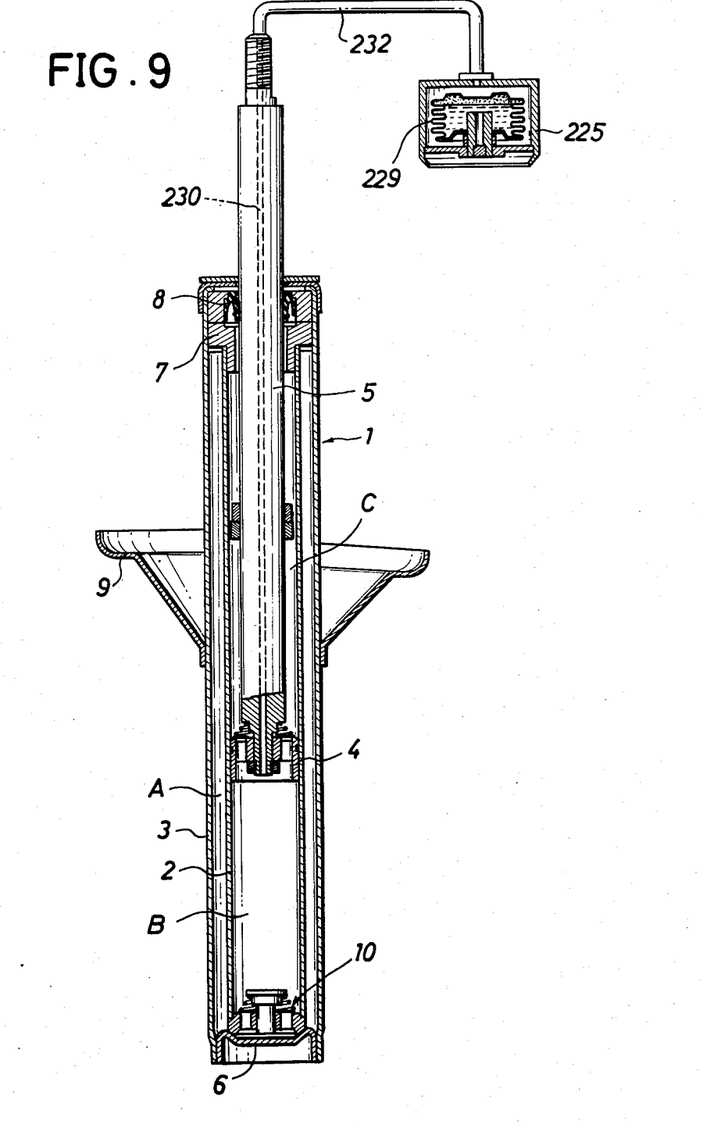
FIG. 9 is a view similar to FIG. 6, but showing a further embodiment of the present invention wherein a gas chamber is provided at the side of a piston and outside of the shock absorber.
Figure 10:
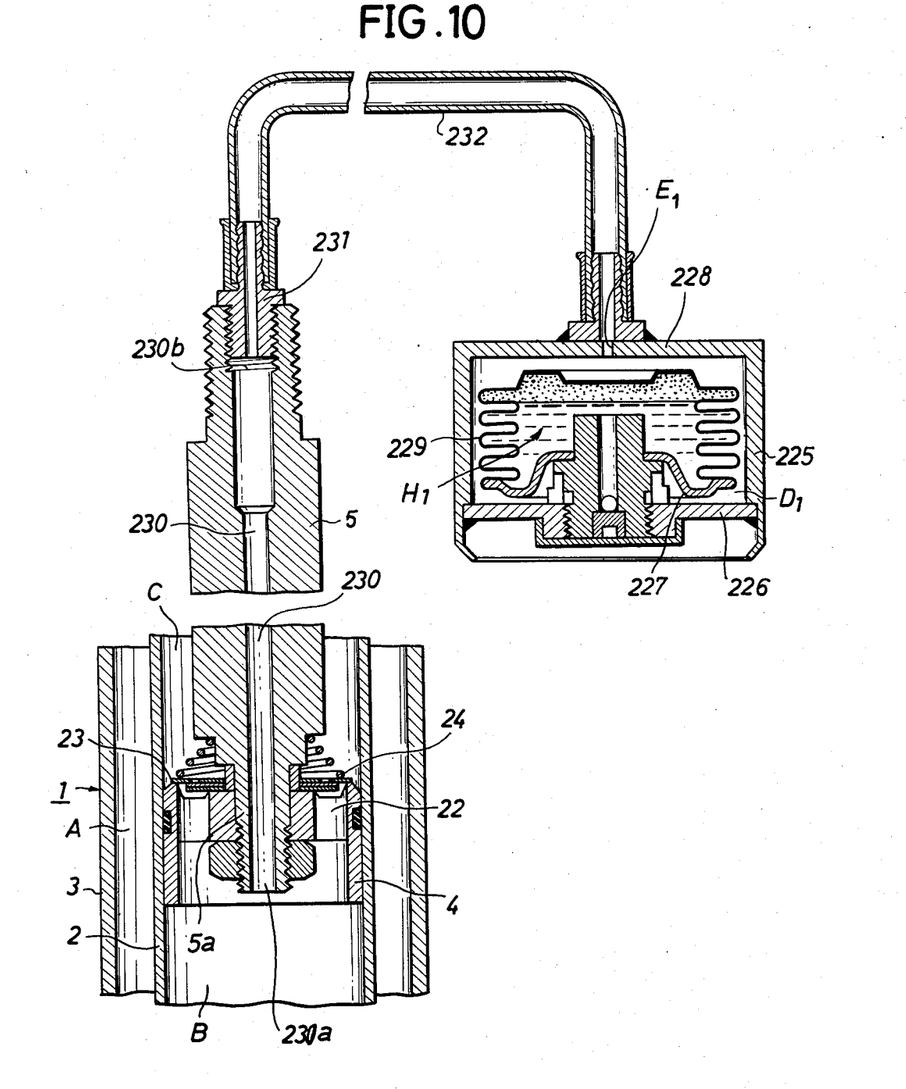
FIG. 10 is an enlarged sectional view showing an essential portion of the shock absorber of FIG. 9.

FIGS. 9 and 10 show a fourth embodiment of the invention wherein a gas chamber is disposed at the side of a piston but outside of the cylinders. The piston rod 5 is formed therein with an axial oil passage 230, which is opened at 230a at the lower end 5a of rod 5. A communication conduit 232 is connected by means of a joint 231 to the upper end opening 230b of rod 5, the conduit 232 having its leading end formed with the chamber $D_1$ defined by a casing 225. The chamber $D_1$ communicates with the inner cylinder oil chamber B through the orifice $E_1$ which is formed in the ceiling wall 228 of the casing 225. An elastic metal membrane 229, such as a metal bellows made of phosphor bronze, is placed in an inverted position within chamber $D_1$ on a holder 227, which is supported by the bottom wall 226 of the casing 225, to thus form the gas chamber $H_1$ which is hermetically separated from the surroundings. The gas chamber $H_1$ is charged with gases such as $N_2$ and a liquid such as an oil, and the pressure in the gas chamber $H_1$ is preset at substantially the same level as that of the working oil in the chamber B when the vehicle is standing still.

Because the above-described fourth embodiment of the invention operates in a manner similar to that of the third embodiment described with reference to FIGS. 6 and 7, but has the gas chamber thereof disposed at the side of the piston but outside of the cylinders, the lengths of the cylinders can be reduced, and the construction of the piston assembly can be simplified.

Figure 11:
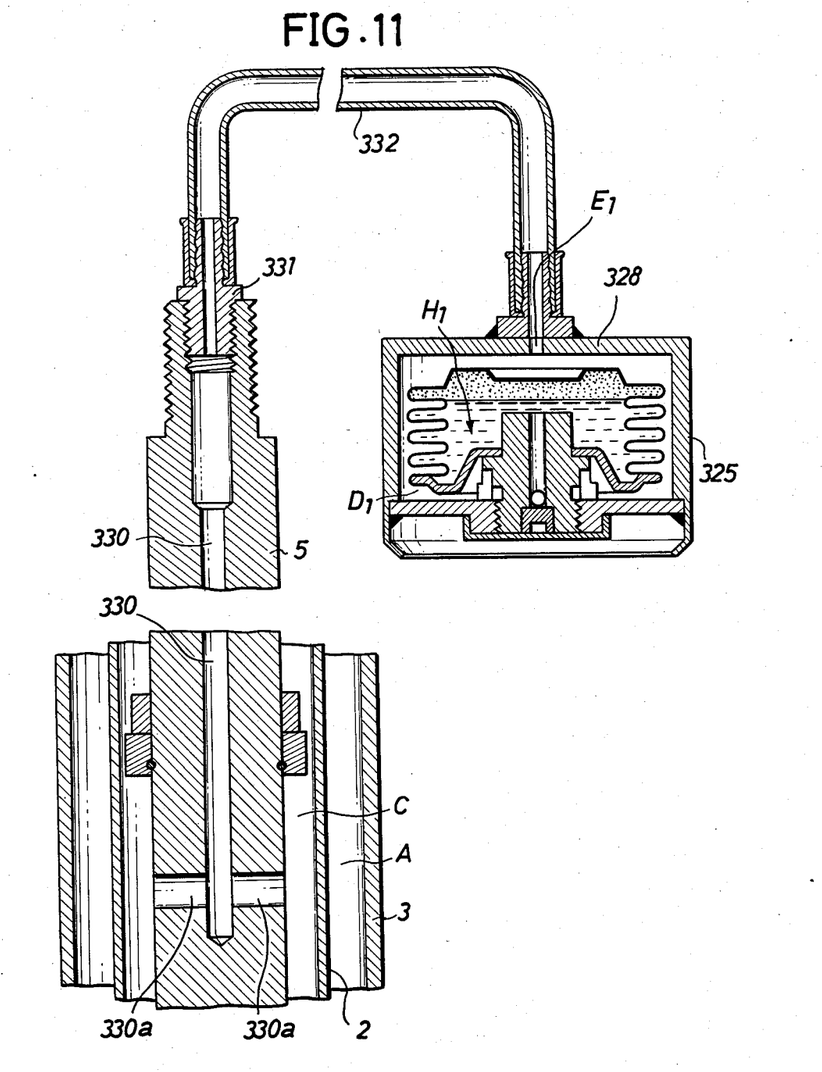
FIG. 11 is a view similar to FIG. 10, but showing a modification of the shock absorber of FIGS. 9 and 10.

FIG. 11 shows a modification of the fourth embodiment shown in FIGS. 9 and 10. In this modification, a blinded passage 330 formed upright in the piston rod 5 and extending above the piston has its lower portion communicating with the chamber C through a plurality of branch passages 330a. A communication conduit 332 is connected at one end to the upper end of the passage 330 through a joint 331. The communication conduit 332 is connected at the other end through the orifice $E_1$ to the ceiling wall 328 of a casing 325 which is disposed outside of the cylinders and defines therein the chamber $D_1$. In the chamber $D_1$ is disposed the gas chamber $H_1$ which is defined by an elastic metal bellows 329 and separated from the surroundings. Thus, the damping force at the initial stage of the extension stroke can be obtained in a manner similar to the fourth embodiment shown in FIGS. 9 and 10.

In this modification, the volume of the gases in the gas chamber $H_1$, as well as the volume of the gases in the gas chamber H in the foregoing embodiments, is selected to correspond to the amount of the oil which is displaced from the oil chamber B or C at the time when the piston moves to absorb the shocks caused by small irregularities in the road surface. If the piston stroke is predetermined at a length of approximately 10 mm, it is sufficient for travel on a normal road, and if predetermined at approximately 15 mm, it is sufficient even for travel on a rough road. On the other hand, the piston stroke required for controlling the rolling or bounding of spring-supported parts is within approximately 20–120 mm.

Thus, the volume V ($cm^3$) of the gases in the gas chamber H or $H_1$ in each of the above-described embodiments shown in FIGS. 1–11 can be selected, while taking into consideration the fact that the remaining volume of the gases in the gas chamber at the compression stroke should be one-half to one-tenth of the initial V, as follows:

In the compression stroke:

$$\frac{\pi d^2}{4} \times 1.5 = \frac{1}{2} V \text{ to } \frac{9}{10} V \quad (1)$$

In the expansion stroke (for the embodiments shown in FIGS. 8 and 11):

$$\frac{\pi}{4}(D^2 - d^2) \times 1.5 = \frac{1}{2} V \text{ to } \frac{9}{10} V \quad (2)$$

From the above equations (1) and (2), respectively:

$$V \leq 0.75\pi d^2 \text{ or } 0.75\pi(D^2 - d^2)$$

(wherein
d=diameter of piston rod in centimeters and
D=inside diameter of inner cylinder in centimeters.)

In a conventional hydraulic shock absorber, the arrangement of which is similar to that of the present invention with the exception that the conventional hydraulic shock absorber includes no mechanism corresponding to the casing and gas chamber assembly of the present invention, the oil flow during the compression stroke of the piston is as follows. The oil in the lower chamber (corresponding to chamber B of the present invention) flows into the upper chamber (corresponding to chamber C of the present invention) via the piston with substantiallly no resistance being developed, and concurrently into the reservoir (A of the present invention) defined by the outer cylinder while resistance is developed at an orifice in the bottom of the cylinders. In this case, the total volume $V_o$ of the oil which is to flow into the reservoir corresponds to the increment of the volume of the piston rod thrust into the inner cylinder. Thus, the volume $V_o$ is such that:

$$V_o = \pi \left(\frac{d}{2}\right)^2 \times l = \frac{\pi}{4} d^2 \cdot l$$

wherein
l=length of compression stroke, and
d=the diameter of the piston rod.

From the foregoing, the equation (1) set forth hereinabove will be clearly understood.

Also with respect to a conventional hydraulic shock absorber, because there exists substantially no resistance between the lower chamber (B) and the upper chamber (C) during a compression stroke as described above, it will be readily understood that the oil chamber D of the present invention confining the gas chamber H therein and defined by the casing 15 always functions effectively to absorb resistance between the chamber B and the reservoir A during only an initial stage of a compression stroke because of the defined value of the gases in gas chamber H (i.e., $V \leq 0.75\pi d^2$, assuming $l \leq 1.5$ cm). Such is the case when the chamber D is arranged to be in communication with either the upper chamber C or the lower chamber B.

During the expansion stroke of the piston, the oil in the upper chamber (C) flows into the lower chamber (B) via an orifice in the piston with a certain resistance, while the oil in the reservoir (A) flows into lower chamber (B) substantially without resistance. In this case, the total volume $V_o$ of the oil which is to flow into the lower chamber (B) from the upper chamber (C) corresponds to the decrement of the volume of the upper chamber (C). Thus, the volume $V_o$ is such that:

$$V_o = \left[ \pi \left( \frac{D}{2} \right)^2 - \pi \left( \frac{d}{2} \right)^2 \right] \times l$$

$$= \left( \frac{\pi}{4} D^2 - \frac{\pi}{4} d^2 \right) \times l$$

$$= \frac{\pi}{4} (D^2 - d^2) \cdot l$$

wherein
l=length of expansion stroke,
D=the diameter of the inner cylinder, and
d=the diameter of the piston rod.

From the foregoing, equation (2) set forth hereinabove will be readily understood.

Because there exists resistance between the upper chamber (C) and the lower chamber (B) during an expansion stroke as described hereinabove, it will be readily understood that the oil chamber D of the present invention functions effectively so as to absorb resistance between the upper chamber C and the lower chamber B during only an initial stage of an expansion stroke because of the defined value of the gases in the gas chamber H (i.e., $V \leq 0.75 \pi(D^2-d^2)$, assuming $l \leq 1.5$ cm). However, such is the case only when the chamber D is arranged to be in communication with the upper chamber C.

It will thus be understood that in the FIGS. 8 and 11 embodiments of the present invention, wherein the chamber D is arranged to be in communication with the upper chamber C, the gas chamber H functions effectively during initial stages ($l \leq 1.5$ cm) of either of the compression and expansion stroke, while in the other embodiments shown in FIGS. 1-7, 9 and 10 wherein the oil chamber D is arranged to be in communication wih the lower chamber B, the gas chamber H functions effectively during an initial stage ($l \leq 1.5$ cm) of a compression stroke only.

The present invention has been described in detail hereinabove in connection with preferred embodiments thereof, however, it will be understood that the membrane fitting arrangement and the structure of the gas chamber is not limited to the specific exemplary constructions described hereinabove. It will be further understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A hydraulic shock absorber for vehicles, comprising:
   inner and outer cylinders filled with a working oil;
   a piston slidably fitted in said inner cylinder;
   a piston rod supporting said piston;
   a bottom valve disposed at the bottoms of said inner and outer cylinders;
   a first passage provided in said piston so as to pass axially therethrough;
   a first valve means operatively cooperating with said first passage;
   a second passage provided in said bottom valve for providing communication between said inner and outer cylinders;
   a second valve means operatively cooperating with said second passage;
   a casing defining an oil chamber therein, said oil chamber being arranged to be in communication with the interior of said inner cylinder;
   a gas chamber hermetically defined by an elastic metal membrane, said gas chamber having gases confined therein;
   said gas chamber being disposed in said oil chamber;
   said elastic metal membrane defining said gas chamber being elastically deformable while compressing said gases in said gas chamber at a rate corresponding to a rising oil pressure in said oil chamber during only an initial stage of at least a compression stroke of said piston;
   the pressure of said gases confined in said gas chamber being set substantially at atmospheric pressure, such that it is substantially the same as said working oil pressure when said piston stands still; and
   the volume V (cm³) of said gases in said gas chamber being such that:

$V \leq 0.75 \pi d^2$ or $0.75\pi(D^2-d^2)$ wherein d=the diameter of said piston rod (in centimeters) and D=the inside diameter of said inner cylinder (in centimeters).

2. A hydraulic shock absorber according to claim 1, wherein:
   said gas chamber has further confined therein a working liquid.

3. A hydraulic shock absorber according to claim 1, wherein:
   said casing defining said oil chamber is disposed adjacent said bottom valve; and
   an orifice provided in a system other than that of said second passage is arranged to provide communication between sail oil chamber and the interior of said inner cylinder.

4. A hydraulic shock absorber according to claim 3, wherein:
   said elastic metal membrane defining said gas chamber is elastically deformable by the oil pressure applied from the lower side of said gas chamber.

5. A hydraulic shock absorber according to claim 3, wherein:
   said elastic metal membrane defining said gas chamber is elastically deformable by the oil pressure applied from the upper side of said gas chamber.

6. A hydraulic shock absorber according to claim 1, wherein:
   said casing defining said oil chamber is disposed outside of said inner and outer cylinders; and
   a conduit is arranged to provide communication between said oil chamber and the interior of said inner cylinder through said bottom valve.

7. A hydraulic shock absorber according to claim 1, wherein:

said casing defining said oil chamber is formed in said piston; and an orifice provided in a system other than that of said first passage is arranged to provide communication between said oil chamber and the interior of said inner cylinder.

8. A hydraulic shock absorber according to claim 7, wherein:

said casing is formed in a downward extension of said piston; and said orifice is formed in the bottom wall of said casing to permit communication of said oil chamber with a chamber defined below said piston in said inner cylinder.

9. A hydraulic shock absorber according to claim 7, wherein:

said orifice is formed in the upper wall of said casing to permit communication of said oil chamber with a chamber defined above said piston in said inner cylinder through a passage extending through said piston rod.

10. A hydraulic shock absorber according to claim 1, wherein:

the value $V \leq 0.75\pi d^2$ relates to the volume V (cm$^3$) of said gases in said gas chamber in the compression stroke of said shock absorber.

11. A hydraulic shock absorber according to claim 1, wherein:

the value $V \leq 0.75\pi(D^2 - d^2)$ relates to the volume V (cm$^3$) of said gases in said gas chamber in the expansion stroke of said shock absorber.

12. A hydraulic shock absorber according to claim 1, wherein:

said casing defining said oil chamber is disposed outside of said inner and outer cylinders;

said piston rod is provided with an oil passage extending axially therethrough, said oil passage being open at both the upper and lower ends thereof;

a conduit is arranged to provide communication between the interior of said inner cylinder and said casing defining said oil chamber through said oil passage of said piston rod; and said conduit is connected with said upper open end of said oil passage of said piston rod.

13. A hydraulic shock absorber according to claim 1, wherein:

said casing defining said oil chamber is disposed outside of said inner and outer cylinders;

said piston rod is provided with an axially-extending oil passage having an open upper end and a blinded lower end;

a lower portion of said piston rod is provided with a plurality of branch passages providing communication between the interior of said inner cylinder and said blinded oil passage of said piston rod;

a conduit is arranged to provide communication between the interior of said inner cylinder and said casing defining said oil chamber, through said oil passage and said branch passages of said piston rod; and said conduit is connected with said upper open end of said oil passage of said piston rod.

* * * * *

UNITED STATES PATENT AND TRADEMARK OFFICE
CERTIFICATE OF CORRECTION

PATENT NO. : 4,614,255
DATED : September 30, 1986
INVENTOR(S) : Isamu MORITA et al It is certified that error appears in the above-identified patent and that said Letters Patent are hereby corrected as shown below:

Column 5, line 24, change "seal" to --sealed--.

Column 8, line 7, after "initial" insert --volume--.

Claim 3, line 7, (column 10, line 48) change "sail"

to --said--.

Signed and Sealed this

Twenty-fourth Day of February, 1987

*Attest:*

DONALD J. QUIGG

*Attesting Officer*     *Commissioner of Patents and Trademarks*